United States Patent
Kirchhoff et al.

(10) Patent No.: US 8,961,030 B2
(45) Date of Patent: Feb. 24, 2015

(54) BEARING COMPRISING A CORROSION-RESISTANT BEARING PART

(75) Inventors: Nico Kirchhoff, Schwebheim (DE); Christian Schulte-Nolle, Bamberg (DE); Thomas Loesche, Wipfeld (DE); Claus Muller, Eckental (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/111,621

(22) PCT Filed: Apr. 12, 2012

(86) PCT No.: PCT/EP2012/056633
§ 371 (c)(1),
(2), (4) Date: Oct. 14, 2013

(87) PCT Pub. No.: WO2012/146485
PCT Pub. Date: Nov. 1, 2012

(65) Prior Publication Data
US 2014/0044387 A1 Feb. 13, 2014

(30) Foreign Application Priority Data
Apr. 29, 2011 (DE) .......................... 10 2011 017 776

(51) Int. Cl.
| F16C 41/00 | (2006.01) |
| C23F 13/06 | (2006.01) |
| C23F 13/10 | (2006.01) |
| F16C 19/22 | (2006.01) |
| F16C 33/76 | (2006.01) |

(52) U.S. Cl.
CPC ............. *F16C 41/002* (2013.01); *F16C 41/004* (2013.01); *C23F 13/06* (2013.01); *C23F 13/10* (2013.01); *F16C 19/22* (2013.01); *F16C 33/76* (2013.01); *C23F 2213/21* (2013.01)
USPC .......................................................... 384/624

(58) Field of Classification Search
CPC ............. F16C 2202/30; F16C 2202/32; F16C 2300/42; C23F 13/00; C23F 13/06; C23F 2213/21
USPC ................. 384/476, 624; 204/196.01, 196.37; 205/735, 740
See application file for complete search history.

(56) References Cited

U.S. PATENT DOCUMENTS

| 2005/0078897 A1 | 4/2005 | Zhang |
| 2011/0188794 A1 | 8/2011 | Beresch et al. |

FOREIGN PATENT DOCUMENTS

| DE | 1253994 | | 11/1967 |
| DE | 2019377 | | 11/1970 |
| DE | 102008048412 | | 11/2009 |
| DE | 102008035717 | | 2/2010 |
| JP | 06050343 | A * | 2/1994 |
| JP | 2002106588 | | 4/2002 |
| JP | 2007056926 | | 3/2007 |
| WO | 0133091 | | 5/2001 |

* cited by examiner

*Primary Examiner* — Phillip A Johnson
(74) *Attorney, Agent, or Firm* — Volpe and Koenig, P.C.

(57) ABSTRACT

A bearing, including a bearing part, in particular a bearing ring (5, 6) having a cathodic corrosion prevention device. The aim of providing a bearing having a permanent, adjustable corrosion prevention device that requires only minor structural changes is achieved according to the invention in that the bearing part, in particular the bearing ring (5, 6), is connected as the cathode of an external power source, and that the anode (8, 10) of the external power source is arranged spaced apart from the bearing part, in particular the bearing ring (5, 6).

13 Claims, 4 Drawing Sheets

BEARING COMPRISING A CORROSION-RESISTANT BEARING PART

FIELD OF THE INVENTION

The invention relates to a bearing.

From practice, bearings, in particular, anti-friction or sliding bearings, are known that are used in a strongly electrochemically corrosive environment, in particular, in electrically conductive, in particular, aqueous fluids, such as seawater, process water, waste water, cleaning fluids, or coolants based on water. Appropriate corrosion protection plays an important role for bearing parts of such bearings. The invention is described below, especially with reference to seawater, as an electrically conductive, corrosive fluid, but it is understood that a different electrically conductive fluid, especially an electrically conductive fluid based on water, can also be provided.

DE 10 2008 048 412 A1 describes a bearing, especially an anti-friction bearing, with a bearing part formed as a bearing ring, wherein a sacrificial anode is arranged on the bearing ring as a cathodic corrosion protection device. The material of the sacrificial anode is electrochemically less inert than the material of the bearing ring, so that an electrically short-circuited, galvanic contact element is formed between the sacrificial anode and the material of the bearing ring, wherein the sacrificial anode dissolves instead of the bearing ring. It is disadvantageous that, after some amount of time, the material of the sacrificial anode is consumed, so that the cathodic corrosion protection exists only for a limited time. It is also disadvantageous that the cathodic corrosion protection exists only in the direct vicinity of the sacrificial anode; protection of larger areas requires a large-area coating or a high-mass sacrificial anode, wherein, however, the large-area coating or the high-mass sacrificial anode dissolves only non-uniformly. It is also disadvantageous that structural changes must be performed on the bearing part, in particular, the bearing ring, in order to apply the sacrificial anode, especially when the sacrificial anode has a large-area or high-mass construction.

JP 2007056926 AA (Abstract) describes a wheel bearing with a sensor unit and an assembly holder for the sensor unit on the wheel bearing, wherein the assembly holder is protected from corrosion by a layer or an anode mass as a sacrificial anode.

JP 2002106588 AA (Abstract) describes a bearing with a cage in an alkali corrosive environment, wherein a galvanic coating is applied as a sacrificial anode on an end section of the cage.

US 2005/0078897 A1 describes a bearing, wherein metallic layers are arranged as sacrificial anodes on the inner sides of this bearing.

WO 01/33091 A1 describes a bearing with a DLC coating as corrosion protection.

SUMMARY

The object of the invention is to disclose a bearing with a durable, adjustable corrosion protection device that requires only minor structural changes.

This objective is met with a bearing according to the invention in that the bearing part, in particular, the bearing ring, is connected as a cathode of an external power source and the anode of the external power source is arranged at a different physical location relative to the bearing part, in particular, the bearing ring.

The invention is described and explained in more detail below with reference to a bearing part that is formed as a bearing ring and is connected as a cathode of the external power source, wherein it is understood that other bearing parts, such as bearing covers, rolling bodies, or cages of an anti-friction bearing, or guide rings could also be provided as bearing parts.

The bearing ring is here connected in an electrically conductive way to the cathodic pole of the external power source. An anode is also provided that has no direct, electrically conductive contact with the bearing ring, wherein the anode is connected to the anodic pole of the external power source. The external power source causes a potential difference at the boundary of the bearing ring to the surrounding electrolytic medium, especially the seawater, wherein the potential difference corresponds in magnitude to the electrochemical potential that causes the corrosive dissolution of the material of the bearing ring. In the ideal case, the external power source does not deliver power directly, so that the external power source can be operated partially in a self-regulating way or alternatively can be driven and regulated by means of a controller.

The bearing according to the invention offers the advantage of being able to adjust the protective current required for the cathodic protection of the bearing ring for a short time, in order to be able to compensate for temperature changes or flow rate or changes to the chemical composition of the electrolyte. The external power source itself and the anode are not consumed, so that long-lasting corrosion protection of the bearing ring is possible that is not associated, in particular, with significant consumption of materials. The invention offers the further advantage of providing corrosion protection on bearing parts, in particular, bearing rings of an anti-friction or sliding bearing, without requiring significant structural changes to the bearing parts. In anti-friction bearings, in particular, the raceways that are rolled over or, in sliding bearings, the sliding-contact sliding surfaces can also be protected against corrosion; in particular, by means of an individual electrical contact to the cathodic pole of the external power source, the entire bearing ring, that is, both its lateral surface and also end-face surfaces, including the raceways for the rolling bodies, can be protected against corrosion. The corrosion protection is independent of the size of the bearing part and thus can be scaled accordingly. Furthermore, the options in selecting the materials both for the bearing part, especially the bearing ring, and also for the anode, are only slightly limited, as long as the bearing part connected as the cathode is electrically conductive and the anode is electrically conductive and resistant to corrosion.

The external power source can be integrated structurally on the bearing itself, for example, directly in the bearing or the bearing part to be protected, or else can be arranged at a greater spatial distance to the bearing.

Advantageously it is provided that the external power source comprises a power supply that is uninterrupted even if the shaft is at a standstill. The power supply that is uninterrupted even if the shaft is at a standstill offers the advantage of being able to supply the external power source even when the bearing is at a standstill, because even when the bearing is at a standstill there is still the risk of corrosion of the bearing ring. The power supply can comprise, for example, a battery. The battery can be provided here as a rechargeable battery (accumulator) and offers the advantage of providing, in terms of energy, an essentially autonomous voltage source that is independent of the installation situation of the bearing. As an alternative to a battery or to an accumulator, it can be provided to draw energy that the external power source applies from the bearing by means of a generator. As an alternative to a battery or another storage device of electrical energy, a generator, for example, a solar collector or a fuel cell, could be provided as the power supply. The bearing itself could be formed as a generator bearing, in order to obtain electrical energy from the mutual rotation of the bearing rings, and can comprise a power storage device that maintains the power supply even if the bearing is at a standstill.

Advantageously it is provided that the anode is constructed as a ring anode that is arranged on a carrier ring. The ring-shaped formation of the anode as a ring anode offers the advantage of forming an essentially homogeneous field relative to the approximately circular ring-shaped bearing ring, so that peak charges can be avoided at which particles could otherwise be deposited.

In an especially preferred way it is provided, with respect to the arrangement of the ring anode, that each of the two end faces of the bearing ring is arranged opposite a ring anode, so that a homogeneous electrical field is formed through the electrolyte to the bearing ring connected as the cathode. The carrier ring holds the ring anode at a distance not only from the bearing part connected as the cathode, in particular, the bearing ring, but also from other components of the support holding the bearing, for example, from a shaft or bearing mount supported in the bearing in which the bearing is arranged in a stationary way. A carrier ring can hold an individual ring anode, for example, centrally along the lateral surface of the carrier ring, or several ring anodes, for example, two ring anodes that are arranged on the two opposite end faces of the carrier ring. In any case, the ring anodes have a contact to the electrolyte with which the bearing part connected as the cathode is also in contact, but also electrically isolated relative to other parts of the bearing arrangement.

Advantageously, it is provided with respect to the ring anode that the ring anode is formed from oxide-coated titanium. The ring anode is here formed as an inert anode that is also formed to be corrosion resistant in the anodic connection, for example, does not corrode even in seawater as the electrolyte. The titanium of the anode has a coating made from a mixed oxide that contains electrochemically inert metals, such as platinum or ruthenium.

As an alternative to the formation of the anode as a ring anode, it is advantageously provided that the anode is formed as a screen anode. The screen anode here comprises a perforated, essentially flat sheet. As an alternative, the screen anode could comprise a flat fabric or web made from an electrically conductive material. Depending on the actual construction of the screen anode, this has the effect of limiting the flow of the electrolyte through the bearing and keeping particles away from the bearing. The screen anode suppresses the occurrence of turbulence in the bearing and prevents the occurrence of peak voltages at which corrosion could appear.

Advantageously it is provided that a reference electrode is provided. The reference electrode allows the actual electrochemical potential on the surface of the bearing part connected as the cathode to be determined and thus whether the actually present electrochemical potential has the value of zero volts or is trending toward a value of approximately zero volts. The actual electrochemical potential can deviate from a target value, for example, due to temperature fluctuations in the bearing part or in the electrolyte. Likewise it is imaginable that the conductivity of the electrolyte is variable over time, in seawater, for example, due to the salt content. The actual electrochemical potential that is on the surface of the bearing part connected as the cathode and is determined based on the reference electrode is used as a control parameter for controlling the external power source, so that the external power is set such that, on the surface of the bearing part, the electrochemical potential always disappears and here has a value of approximately zero volts. The reference electrode is arranged in the spatial vicinity to the bearing part connected as the cathode, for example, is attached to a bearing mount close to the bearing ring connected as the cathode.

Advantageously it is provided that the bearing part has an electrically insulating layer. The electrically insulating layer of the bearing part connected as the cathode ensures, especially in connection with the reference electrode, that the measured value obtained by means of the reference electrode reproduces only the electrochemical potential on the surface of the bearing part to be protected, so that disrupting influences of other electrochemical potentials, for example, on the shaft or relative to the bearing mount, cannot affect the control of the protective current of the external power source. The electrically insulating layer can be formed as a coating on the material of the bearing part connected as the cathode or else by a sleeve that is fixed on the bearing part.

Advantageously it is provided that the bearing part, in particular, the bearing ring, is connected in an electrically conductive way to another bearing part, in particular, another bearing ring. The two bearing parts, in particular, the two bearing rings, can be connected together as the cathode and thus can also together protect against corrosion. The electrically conductive connection of the two bearing parts can be formed in an anti-friction bearing with electrically non-conductive, for example, ceramic, rolling bodies by a contact element, for example, an elongated, dimensionally stable contact pin that connects the outer ring to the inner ring.

Advantageously it is provided that a sacrificial anode is connected with an electrically conductive contact to the bearing part, in particular, the bearing ring. The sacrificial anode takes over the cathodic protection for the case that the external power source is out of operation, for example, due to maintenance.

Advantageously it is provided that the bearing part, in particular, the bearing ring, has a corrosion-inhibiting coating. The corrosion-inhibiting coating ensures corrosion protection for the case that the external power source is out of operation for a short time.

Additional advantages and features emerge from the dependent claims and also from the following description of a preferred embodiment of the invention.

The invention is described and explained in more detail below with reference to the accompanying drawings.

DETAILED DESCRIPTION OF THE PREFERRED EMBODIMENTS

Figure 1:
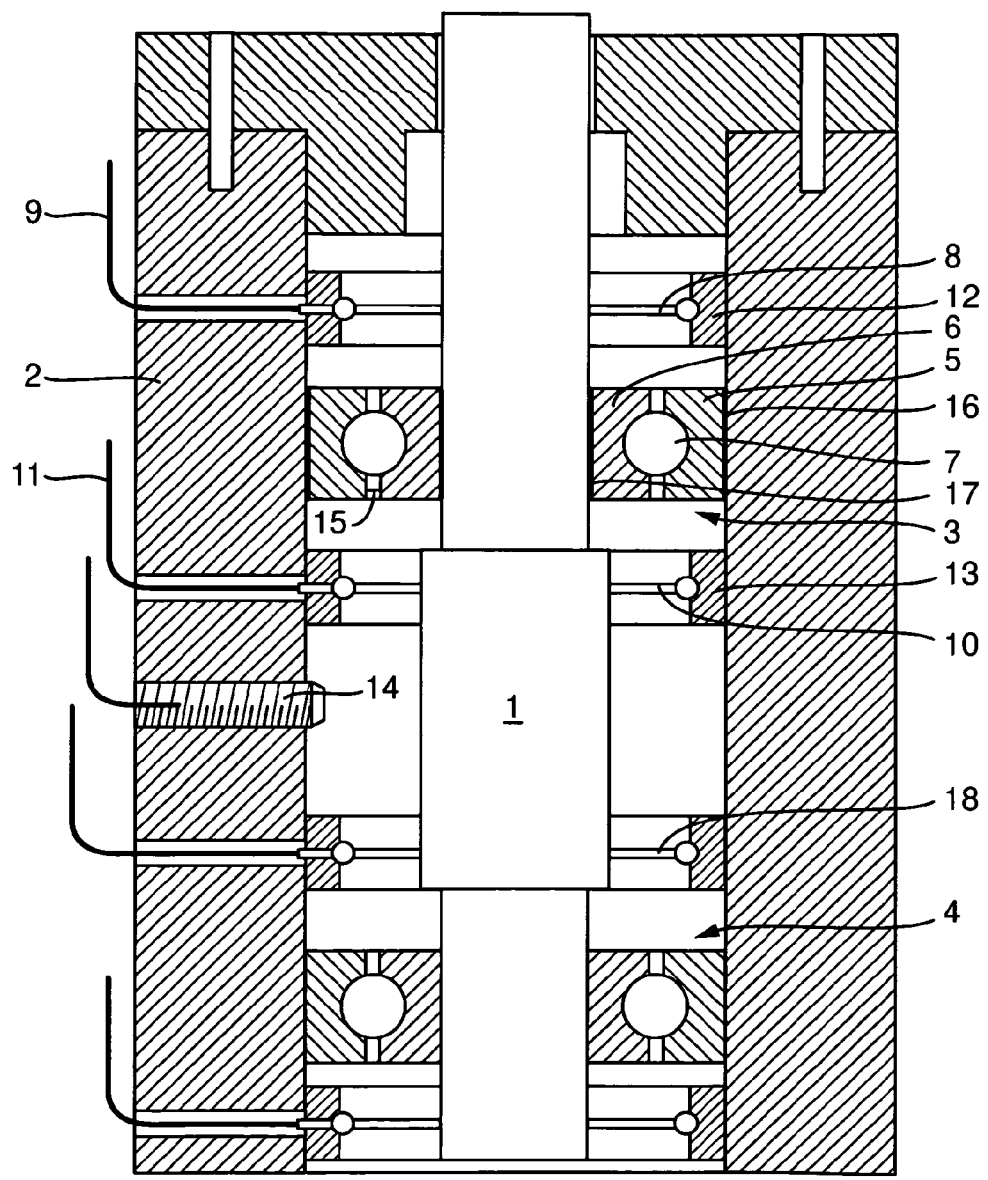
FIG. 1 shows schematically a partially sectioned view of a first embodiment of a bearing according to the invention.

FIG. 1 shows a bearing arrangement for the rotating support of a shaft 1 on a housing 2, wherein the bearing arrangement comprises a first bearing 3 and a second bearing 4 spaced apart axially, in the direction of the extent of the shaft 1. Both bearings 3, 4 have identical constructions, so that initially only the first bearing 3 will be described in more detail below.

The bearing 3 is formed as an anti-friction bearing and comprises, as the first bearing ring 5, an outer ring 5 that is mounted on the housing 2, as the second bearing ring, an inner ring 6 that is mounted on the shaft 1, and rolling bodies 7 made from a ceramic material. The outer ring 5 and the inner ring 6 here form the two bearing rings 5, 6 of the anti-friction bearing 3.

The bearing 3 further comprises an active cathodic corrosion-protection device. As part of the cathodic corrosion protection device, the first bearing ring 5 is connected as the cathode of an external power source, in particular, the first bearing ring 5 is connected in an electrically conductive way to the cathodic pole of the external power source. As another part of the cathodic corrosion protection device, the external power source comprises an anode 8 that is arranged spatially spaced apart from the first bearing ring 5 connected as the cathode. Between the anode 8 and the first bearing ring 5 connected as the cathode there is an electrolyte that is in contact both with the anode 8 and also with the cathode, namely the first bearing ring 5, so that charge equalization between the cathode and the anode 8 is possible via the electrolyte. The anode 8 is connected to the anodic pole of the external power source via an electrically conductive connection 9. In addition to the first anode 8, a second anode 10 is provided that is arranged opposite the first anode 8 with respect to the bearing ring 5. The second anode 10 is connected to the anodic pole of the external power source with a second electrically conductive connection 11.

The anodes 8, 10 are each constructed as ring anodes that surround the shaft 1 concentrically and lie opposite the corresponding end faces of the first bearing ring 5. The ring anodes 8, 10 are arrange on a carrier ring 12, 13, in particular, on the inner lateral surface of the carrier ring 12, in the middle axially, wherein the carrier ring 12, 13 is mounted with the outer lateral surface on the housing 2. The ring anodes 8, 10 maintain a radial distance to the shaft 1, wherein the electrically conductive connections 9, 11 of the anodes 8, 10 are guided through the respective carrier ring 12, 13 to the anodic pole of the external power source.

The anodes 8, 10 are constructed from titanium that is covered by an oxidic coating made from a mixed oxide. The mixed oxide contains inert metal, such as platinum and ruthenium, so that the anodes 8, 10 do not corrode in the provided electrolyte (seawater).

The graphically non-illustrated external power source comprises a battery whose cathodic pole is connected in an electrically conductive way to the cathode, that is, the first bearing ring 5, and whose anodic pole is connected in an electrically conductive way to the anode, that is, the ring anodes 8, 10. The battery of the external power source is arranged in the housing 2 in the vicinity of the first bearing 3. The external power source further comprises a control unit that sets and tracks the current of the external power source such that an electrochemical potential with a magnitude of approximately zero volts is maintained on the contact surface of the cathode, that is, the first bearing ring 5 relative to the electrolyte (seawater), so that the material of the first bearing ring 5 (anti-friction bearing steel) does not go into solution, that is, cannot corrode.

The bearing further comprises a reference electrode 14 that is measured relative to the electrochemical potential of the first bearing ring 5 connected as the cathode. The result of the measurement is an input parameter for the control regulation of the external power source that adjusts the protective current if necessary.

The first bearing part connected as the cathode, namely the first bearing ring 5, is connected in an electrically conductive way to another second bearing part, namely the second bearing ring 6, so that two bearing parts, namely the inner ring 6 and the outer ring 5 of the first bearing 3 are connected together as the cathode and are protected cathodically against corrosion together by the external power source. The electrically conductive connection of the two bearing parts 5, 6 is produced and maintained by a contact element, namely an elongated, dimensionally stable contact pin 15 made from graphite, wherein the contact pin 15 produces and maintains a sliding contact between the two bearing rings 5, 6.

The first bearing ring 5 has an electrically insulating layer 16 on the outer lateral surface, so that a current flow to the housing 2 is suppressed. The layer 16 is here constructed as a coating of the outer lateral surface. The second bearing ring 6 has an electrically insulating layer 17 on the inner lateral surface, so that a current flow to the shaft 1 is suppressed, wherein the layer 17 is also formed as a coating. As the material for the respective insulating layer 16, 17, for example, a ceramic, a polymer such as PEEK or PTFE (Teflon), a coating based on polymer, or a polymer-containing composite, such as a glass fiber-reinforced plastic, is provided. A technical glass is also possible as the material for the electrically insulating layer. The electrically insulating layers 16, 17 ensure that the reference electrode 14 collects only the potential of the two bearing rings 5, 6 connected as the cathode and other interfering electrochemical potentials, for example, on the surface of the shaft 1 or the housing 2, have no influence on the protective current that the external power source supplies.

The end faces of the two bearing rings 5, 6 connected as the cathode, and also the surfaces to the two sides of the raceway of the anti-friction bearing 7 are covered with the material of a sacrificial anode made from a material that is electrochemically less inert, such as zinc, aluminum, or magnesium, compared with the anti-friction bearing steel, so that, if the external power source fails, a time limited cathodic protection for the bearing rings 5, 6 is provided.

The second bearing 4 of the bearing arrangement likewise comprises two ring anodes each in a carrier ring to the two sides of the bearing, so that the two bearings 3, 4 are provided with a total of four ring anodes. The ring anodes allocated to the second bearing 4 can be connected to the external power source with which the ring anodes 8, 10 of the first bearing 3 are connected, so that a common external power source is allocated to the two bearings 3, 4. The reference electrode 14 is arranged centrally between the bearings 3, 4, in particular, centrally between the second ring anode 10 of the first bearing 3 and the adjacent first ring anode 18 of the second bearing 4 and is used as a common reference electrode for both bearings 3, 4.

In the following description of the additional embodiments, the same reference symbols designate features that are identical or comparable in their technical function. In particular, the differences compared with the first embodiment will be emphasized.

Figure 2:
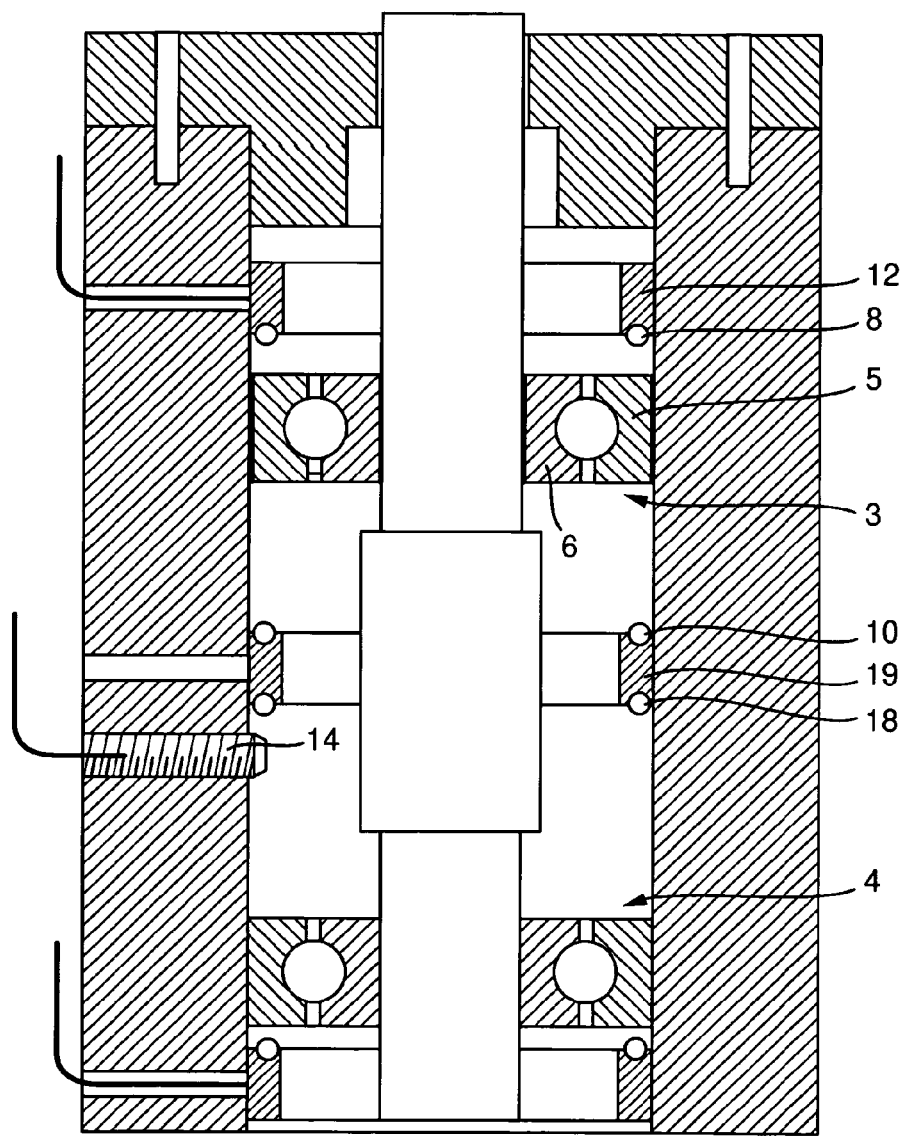
FIG. 2 shows schematically a partially sectioned view of a second embodiment of a bearing according to the invention.

FIG. 2 shows a bearing arrangement with two bearings 3, 4, wherein the respective bearing rings 5, 6 are connected as the common cathode of the external power source. The anode 8 of the external power source is constructed as a ring anode, but arranged in an end side of the carrier ring 12. Between the two bearings 3, 4 there is a common carrier ring 19 on whose first end side the second anode 10 of the first bearing 3 is arranged and on whose second end side the first anode 18 of the second bearing 4 is arranged. A second anode of the second bearing 4 is likewise arranged in an end side of another carrier ring. The common carrier ring 19 is arranged essentially centrally between the two bearings 3, 4.

Figure 3:
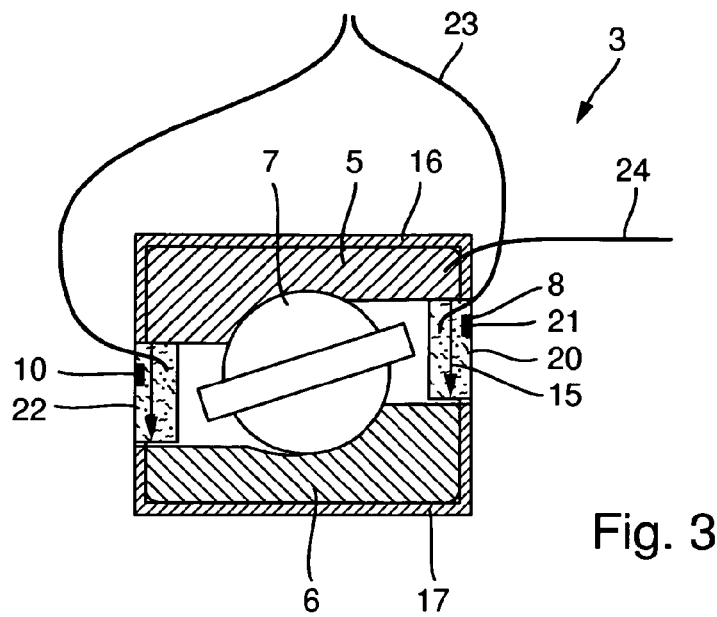
FIG. 3 shows schematically a partially sectioned view of a third embodiment of a bearing according to the invention.

FIG. 3 shows a bearing 3 constructed as an anti-friction bearing with a first bearing ring 4 that is constructed as an outer ring and a second bearing ring 5 that is constructed as an inner ring and with roller bodies 7 made from a non-conductive material. The end faces and the lateral surfaces of each of the two bearing rings 5, 6 are provided with an electrically insulating layer 16, 17, so that the first bearing ring 4 can lie, also with the two end faces, on an electrically conductive connecting construction, for example, a section of a not-shown housing, and the second bearing ring can also lie with the end faces on an edge of a shaft.

The first bearing ring 5 as the first bearing part is connected as the cathode of a not-shown external power source. The second bearing ring 6 as another, second bearing part of the bearing 3 is connected in an electrically conductive way to the first bearing ring 5, wherein a contact element is provided that is electrically insulated relative to the surrounding electrolyte and is made from an electrically conductive material, especially an elongated, dimensionally stable contact pin 15 made from graphite, so that the contact element forms a sliding contact between the first bearing ring 5 and the second bearing ring 6. The contact pin 15 is arranged in a sealing element 20 that is attached rigidly to the first bearing ring 5 and includes a sealing gap opposite the second bearing ring 6. The contact pin 15 passes through the sealing gap and touches the inner lateral surface of the second bearing ring 6. In the area of the sealing element 20, the contact pin 15 is formed or reinforced, for example, by carbon fibers or a metallic fabric, wherein the carbon fibers or the metallic fabric are held in the electrically non-conductive, dimensionally stable material of the sealing element 20. In the sealing element 20, the circular ring-shaped flat anode 8 is held on an outward pointing ring groove 21, wherein this anode is provided as a common anode for the two bearing rings 5, 6. The ring anode 8 here has a contact with a surrounding electrolyte, in this case, also seawater. In this case, the ring anode 8 is arranged between the two bearing rings 5, 6 connected as the cathode, wherein the sealing element 20 also takes on, in addition to the function of holding and storing the ring anode 8, also the function of a seal and the function of a mount for the contact pin 15.

In addition to the first sealing element 20 designated with the reference symbol '20' in FIG. 3, another second sealing element 22 is arranged on the opposite end face, wherein this sealing element holds the second ring anode 10 in another ring groove and holds another contact pin not shown in the figure. The bearing 3 further comprises a reference electrode that is not shown in the figure. The two ring anodes 8, 10 are connected by a common electrically conductive connection 23 to the anodic pole of the external power source, wherein the connection 23 to the anodic pole is guided on the outside around the electrically insulating layer 16 of the first bearing ring 5. The first bearing ring 5 is connected by means of an electrically conductive connection 24 to the cathodic pole of the external power source.

The sealing elements 20, 22 have, in addition to the function of holding the ring anodes 8, 10, the effect of making uniform the flow of the electrically conductive electrolyte, namely the seawater, in the bearing 3, that is, equalizing fluctuations in the flow rate in the bearing 3 and reducing the complication of controlling the external power source of the cathode. This effect also occurs for the case that the sealing elements 20, 20 do not hold the ring anodes 8, 10.

In the embodiment shown in FIG. 3 it was provided that the ring anodes 8, 10 are arranged on the surfaces of the sealing elements 20, 22 pointing outward away from the rolling body 7. It is understood that at least one of the ring anodes 8, 10 can be provided on the side of one of the sealing elements 20, 22 pointing inward toward the rolling body 7.

Figure 4:
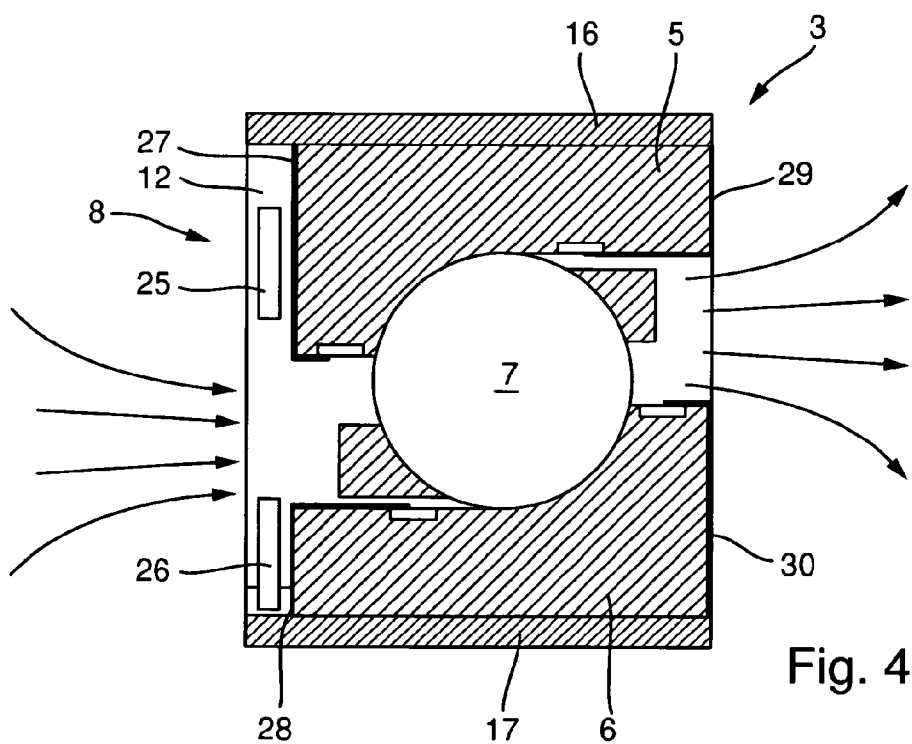
FIG. 4 shows schematically a partially sectioned view of a fourth embodiment of a bearing according to the invention.

FIG. 4 shows a bearing 3 that comprises, as the first bearing part, a first bearing ring 5 constructed as an outer ring, and, as the second bearing part, a second bearing ring 6 constructed as an inner ring. The two bearing rings 5, 6 are connected in an electrically conductive way and together as the cathode of an external power source. The bearing 3 further comprises an anode 8 that is held in a ring disk-shaped carrier ring 12. The carrier ring 12 here lies on each of the end faces of the two bearing rings 5, 6.

The anode 8 comprises a first sub-anode 25 that lies opposite the end face of the first bearing ring 5 and a second sub-anode 26 that lies opposite the end face of the second bearing ring 6. The two sub-anodes 25, 26 are held in respective ring grooves in the electrically non-conductive material of the carrier ring 12, wherein each ring groove is open on the side of the carrier ring 12 pointing away from the corresponding end face, so that the sub-anodes 25, 26 can come in contact with the electrolyte (seawater).

The two sub-anodes 25, 26 are connected to each other in an electrically conductive way, so that, overall, the anode 8 is formed.

The outer lateral surface of the first bearing ring 5 has an electrically insulating layer 16 that is formed by a sleeve that is mounted on the lateral surface. The sleeve here projects over the end surface of the first bearing ring 5 and grips over the carrier ring 12 laterally, so that the lateral surface of the ring disk-shaped carrier ring 12 touches the layer 16.

The inner lateral surface of the second bearing ring 6 has an electrically insulating layer 17 that is also formed by a sleeve mounted on the inner lateral surface. The layer 17 also projects over the end face of the second bearing ring 6, so far that the carrier ring 12 is supported and surrounded on the side.

Between the ring disk-shaped carrier ring 12 and the two end faces of the two bearing rings 5, 6 there is a corresponding electrically insulating layer 27, 28 that improves the insulation of the anode 8 relative to the two bearing rings 5, 6 connected as the cathode and in this respect reinforces the insulating effect of the electrically insulating material of the carrier ring 12.

The carrier ring 12 is broken into sections, in order to allow a medium, namely the seawater or another, electrically conductive electrolyte, in particular, an aqueous electrolyte, to enter into the area between the two bearing rings 5, 6.

On the end sides of the bearing rings 5, 6 opposite the carrier ring 12 and, in sections, on the inner lateral surfaces of the bearing rings 5, 6, at a distance to the raceway of the rolling body 7, a corrosion-inhibiting coating 29, 30, for example, made from a lacquer, is applied. The bearing 3 comprises, in addition to the corrosion-inhibiting coating 29, 30, sacrificial anodes, of which one is designated with the reference symbol '31', wherein the sacrificial anodes 31 are arranged directly to the side of the raceway of the rolling body 7 and are deposited as a layer on the electrically conductive bearing ring 5, 6. The sacrificial anodes 31 can also have the shape of a band, wire, or ring and can be mounted laterally next to the raceway.

In FIG. 4, only a single carrier ring 12 for the first anode 8 is shown. It is understood that another carrier ring can be provided on the opposite end face of the two bearing rings 5, 6. In FIG. 4, a common carrier ring 12 was provided for the two sub-anodes 25, 26 of the first anode 8, wherein the common carrier ring 12 was mounted on the first bearing ring 5. It is understood that for each of the two sub-anodes 25, 26, a separate carrier ring can be provided, so that one of the two carrier rings lies on the end face of the first bearing ring 5 and the other of the two carrier rings lies on the end face of the second bearing ring 6.

In the previously described embodiments, the anode 8, 10 was formed as a ring anode, that is, as a body with a circular ring-shaped form.

Figure 5:
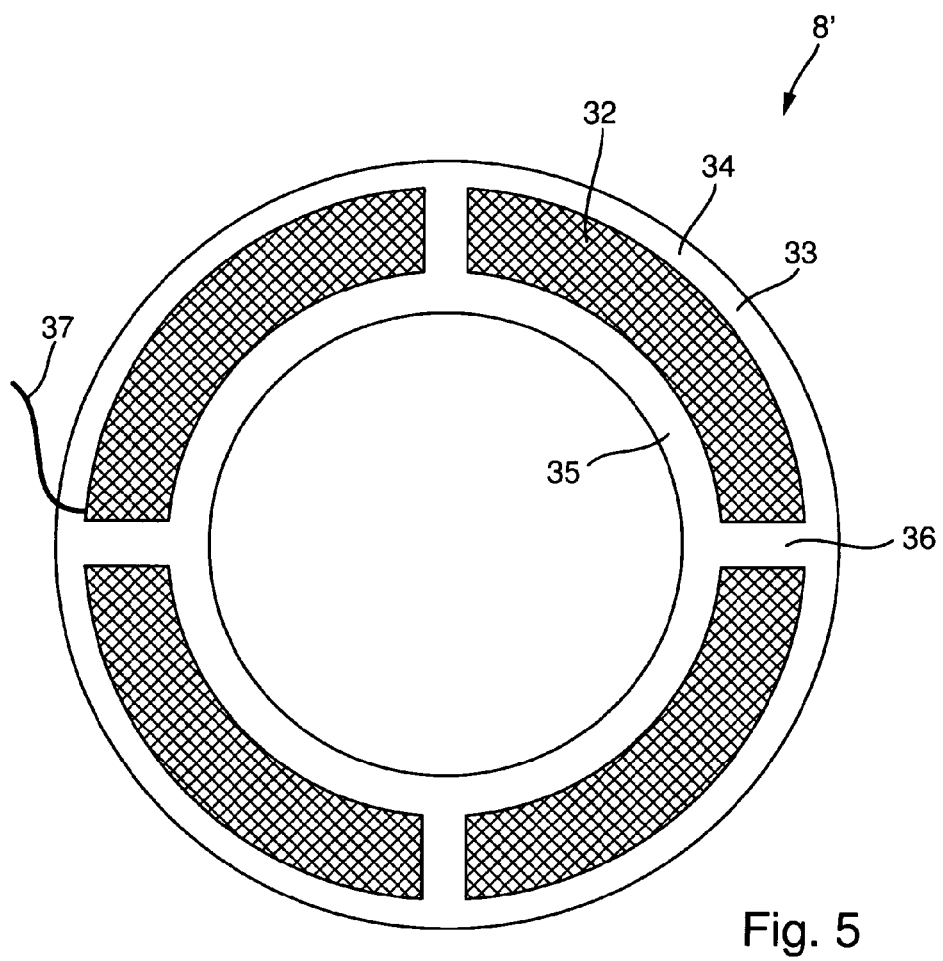
FIG. 5 shows, in a section view, an anode as part of a fifth embodiment of a bearing according to the invention.

FIG. 5 shows an anode 8 formed as a screen anode that is part of another embodiment of a not-shown bearing. The screen anode 8' comprises a circular ring-shaped, perforated sheet 32 in a holder 33, wherein the holder 33 has an outer retaining ring 34 and an inner retaining ring 35 between which the circular ring-shaped sheet 32 is held. The two retaining rings 34, 35 are connected to each other by means of four connecting pieces 36 that are formed above and below the sheet 32. The retaining rings 34, 35 and the connecting pieces 36 are formed of a non-conductive material, for example, a plastic or a ceramic.

The sheet 32 covers the distance between the two bearing rings of the bearing, here the retaining rings 34, 35 are mounted on the end faces of the bearing rings. The sheet 32 is connected by means of an electrically conductive connection 37 to the anodic pole of the external power source.

In the previously described first embodiment (FIG. 1) it was provided that the external power source is mounted on the housing 2 and that an electrically conductive connection is formed between the outer ring 5 and the inner ring 6. The inner ring 6 was formed in an electrically insulated way relative to the shaft 1 by the insulation 17. It is understood that the external power source can be connected in an electrically conductive way to the shaft 1, wherein the shaft 1 is insulated relative to the surrounding electrolyte and that the insulation between the shaft 1 and the inner ring 6 is broken at least in some sections. Between the inner ring 6 and the outer ring 5, an electrically conductive contact is then provided.

List of Reference Symbols
1 Shaft
2 Housing
3 First bearing
4 Second bearing
5 Outer ring
6 Inner ring
7 Rolling body
8, 8' (First) anode
9 Connection of the (first) anode
10 (Second) anode
11 Connection of the (second) anode
12 Carrier ring of the first anode 8
13 Carrier ring of the second anode 10
14 Reference electrode
15 Contact pin
16 Insulating layer of the first bearing ring 5
17 Insulating layer of the second bearing ring 6
18 (First) anode of the second bearing 4
19 Common carrier ring
20 Sealing element
21 Ring groove
22 Additional sealing element
23 Common connection of the anodes 8, 10
24 Electrically conductive connection of the cathode
25 First sub-anode
26 Second sub-anode
27 Insulating layer
28 Insulating layer
29 Corrosion-blocking coating
30 Corrosion-blocking coating
31 Sacrificial anode
32 Perforated sheet
33 Retainer
34 Inner retaining ring
35 Outer retaining ring
36 Connecting piece
37 Conductive connection

The invention claimed is:

1. A bearing, comprising a bearing part with a cathodic corrosion protection device,
the bearing part is connected as a cathode of an external power source, and
an anode of the external power source is arranged at a different physical location relative to the bearing part.

2. The bearing according to claim 1, wherein the external power source comprises a power supply that is uninterrupted even when the shaft is at a standstill.

3. The bearing according to claim 1, wherein the anode is formed as a ring anode that is arranged on a carrier ring.

4. The bearing according to claim 3, wherein the ring anode is formed from oxide-coated titanium.

5. The bearing according to claim 1, wherein the anode is constructed as a screen anode.

6. The bearing according to claim 1, wherein a reference electrode is provided.

7. The bearing according to claim 1, wherein the bearing part has an electrically insulating layer.

8. The bearing according to claim 1, wherein the bearing part is connected in an electrically conductive way to another bearing part.

9. The bearing according to claim 1, wherein a sacrificial anode is connected with an electrically conductive contact to the bearing part, in particular.

10. The bearing according to claim 1, wherein the bearing part has a corrosion-blocking coating.

11. The bearing according to claim 1, wherein a sealing element is provided on the bearing part.

12. The bearing of claim 1, wherein the bearing part comprises a bearing ring.

13. The bearing of claim 12, wherein the bearing ring is connected in an electrically conductive way to another bearing ring.

* * * * *